UNITED STATES PATENT OFFICE.

ARTHUR HEINEMANN, OF WEST KENSINGTON, LONDON, ENGLAND.

PROCESS OF PRODUCING PROPYLENE FROM ACETYLENE AND METHANE.

1,134,677. Specification of Letters Patent. Patented Apr. 6, 1915.

No Drawing. Application filed May 27, 1913. Serial No. 770,221.

*To all whom it may concern:*

Be it known that I, ARTHUR HEINEMANN, a subject of the King of Prussia, residing at 223 North End road, West Kensington, London, W., England, have invented new and useful Improvements in Processes of Producing Propylene from Acetylene and Methane, of which the following is a specification.

This invention relates to an improved process for the production of propylene by the union of acetylene and methane.

The fact that propylene can be produced by the union of acetylene and methane is known to chemists. The yield of propylene hitherto obtained from such union has been of a negligible nature. The present applicant has discovered that a very much enhanced yield of propylene may be obtained if the union of acetylene and methane is effected in the presence of certain contact bodies. These contact bodies consist of an intimate mixture or association of metals of common occurrence, such for example as iron, copper, silver, aluminium and nickel, hereinafter referred to as common contact metals, and metals of rarer occurrence, also acting as catalysts, such for instance as platinum, iridium and palladium, hereinafter referred to as rare metals. Said mixture of catalytic or contact metals permits of a reduction in the temperature at which the union of the acetylene and methane takes place and of the technical production of propylene by the union of acetylene and methane.

The contact bodies may be prepared in the following manner:—One of said common contact metals for example copper is deposited in a porous body, for example pumice stone, either electrolytically or by the reduction of a copper salt. The pumice stone or the like provided with a coating of copper or having its pores partly filled with copper is dipped in a solution of a salt of a rare contact metal, for instance a chlorid of platinum, and is dried. The salt is then, if necessary, reduced. In this way there is obtained a contact body consisting of two metals which exert a mutual balancing effect on one another, the more active property of a rare metal being mitigated by the less active property of the common metal associated therewith, and allow the desired reaction to take place at a moderate temperature. The common contact metals can also be used in a finely divided state or in strip form, as for example copper gauze, copper wool, aluminium turnings or magnesium strip. Such bodies are then prepared by dipping in a solution of a salt of a rare contact metal, such for example as a chlorid of platinum or palladium. The rare contact metal is then deposited by electrolysis. Care must however be taken to immediately wash and dry the contact bodies so prepared in order to avoid destruction of the common metals of said contact bodies.

The process of the present invention is carried out in the following manner:—Equal quantities of acetylene and methane are mixed together and this mixture is passed through heated tubes or vessels containing one of the above described composite contact bodies. The temperature employed varies from 100°–200° C. according to the contact metals employed. The heating of the spaces in which the reaction takes place can either be effected by the application of heat to the exteriors of the tubes or vessels containing the contact bodies or by passing a current of electricity through coils placed in said tubes or vessels. If desired the gases may be heated before admixture or after admixture and prior to their admission to the tubes or vessels containing the contact bodies. Further the heating can be effected at normal pressure, at a reduced pressure or at an increased pressure, and with or without the employment of inert gases or vapors. The use of inert gases such, for example, as carbonic acid gas or nitrogen is recommended, in order to remove the oxygen present at the commencement of the process in the reaction tubes or vessels. The two gases unite to form propylene according to the following:—

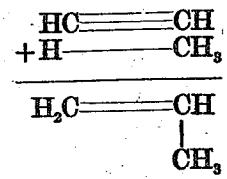

The yield of propylene obtained is approximately 70 per cent.

Having now described my invention what I have invented and desire to secure by Letters Patent in the United States is as follows:—

1. An improvement in the production of propylene from acetylene and methane consisting in effecting the union of the acetylene and methane in the presence of an intimate mixture or association of catalytic metals of common occurrence and catalytic metals of rarer occurrence, substantially as described.

2. A process of producing propylene from acetylene and methane consisting in passing a mixture of acetylene and methane through heated vessels containing an intimate mixture or association of catalytic metals of common occurrence and catalytic metals of rarer occurrence, substantially as described.

In testimony whereof I have signed my name to this specification in the presence of two subscribing witnesses.

ARTHUR HEINEMANN.

Witnesses:
ARTHUR F. ENNIS,
O. J. WORTH.